United States Patent [19]
Johnston et al.

[11] Patent Number: 5,426,977
[45] Date of Patent: Jun. 27, 1995

[54] METHOD FOR ESTABLISHING THE PRESENCE OF SALMONELLA BACTERIA IN EGGS

[75] Inventors: Roger G. Johnston; Dipen N. Sinha, both of Los Alamos, N. Mex.

[73] Assignee: The Regents of the University of California, Alameda, Calif.

[21] Appl. No.: 160,325

[22] Filed: Dec. 2, 1993

Related U.S. Application Data

[63] Continuation of Ser. No. 843,396, Feb. 27, 1992, abandoned.

[51] Int. Cl.⁶ .............................................. G01N 29/12
[52] U.S. Cl. .......................................... 73/595; 73/579
[58] Field of Search ................ 73/579, 582, 595, 659; 209/510

[56] References Cited

U.S. PATENT DOCUMENTS

| | | | |
|---|---|---|---|
| 3,744,299 | 7/1973 | Bliss | 73/595 |
| 4,235,113 | 11/1980 | Carome | 73/655 |
| 4,389,891 | 6/1983 | Fournier | 73/579 |
| 4,801,799 | 1/1989 | Tromborg et al. | 73/655 |
| 5,062,296 | 11/1991 | Migliori | 73/579 |
| 5,131,274 | 7/1992 | Schouenborg | 73/579 |

FOREIGN PATENT DOCUMENTS

| | | | |
|---|---|---|---|
| 0091225 | 5/1985 | Japan | 73/579 |
| 0151749 | 7/1987 | Japan | 73/579 |

OTHER PUBLICATIONS

Translation of JP 151749, Mar. 17, 1993.

Primary Examiner—Hezron E. Williams
Assistant Examiner—Nashmiya Ashraf
Attorney, Agent, or Firm—Samuel M. Freund

[57] ABSTRACT

Measurement of the acoustical resonances in eggs is shown to provide a rapid, noninvasive technique for establishing the presence of *Salmonella bacteria*. The technique is also sensitive to yolk puncture, shell cracks, and may be sensitive to other yolk properties and to egg freshness. Remote characterization, potentially useful for characterizing large numbers of eggs, has been demonstrated.

7 Claims, 4 Drawing Sheets

METHOD FOR ESTABLISHING THE PRESENCE OF SALMONELLA BACTERIA IN EGGS

This is a continuation of application Ser. No. 07/843,396 filed Feb. 27, 1992 now abandoned.

BACKGROUND OF THE INVENTION

The present invention is the result of a contract with the Department of Energy (Contract No. W-7405-ENG-36). It relates generally to a noninvasive, nondestructive, and rapid technique for characterizing eggs, and more particularly to the measurement of acoustic resonances in eggs for characterization and quality control.

Currently, the characterization of eggs is performed manually. For example, the identification of fertilized eggs or eggs having double yolks is accomplished by "candling" where a bright light source is placed behind an egg, and the shape of yolk portion determined by a human observer. Additionally, it would be of significant economic value if a technique were available for automated, remote, noninvasive determination of shell thickness, strength, and integrity as an aid to egg packaging. Moreover, egg freshness and contamination are of considerable concern for public health reasons. As an example, the present technique used for determining the presence of Salmonella in eggs involves a yolk culturing process which requires several hours.

In U.S. Pat. No. 5,062,296, entitled "Resonant Ultrasound Spectroscopy," which issued to Albert Migliori on Nov. 5, 1991, the inventor describes the use of resonant ultrasound spectroscopy, and more specifically, resonant response spectra derived from ultrasonic excitation of objects, to characterize objects. Ultrasound characterizes excitation frequencies beyond human hearing, or above 20 kHz. Since such high frequencies are absorbed or severely attenuated by organic materials, especially when liquid systems are involved, the teachings of the Migliori patent are reasonably directed to solid materials.

An elastic thin shell of revolution possesses many modes of vibrations that are commonly referred to as the resonant modes or resonant frequencies. If the shell is mechanically excited at frequencies that coincide with these resonant frequencies, the resulting large amplitude vibrations of the shell body can easily be detected. At other frequencies, that is, away from resonance, the vibrational response of the shell is minimal.

Most experimental acoustical studies to date have relied on artificially made resonators. Eggs represent a class of resonators in which a sturdy, but thin, shell completely surrounds fluid contents. The vibrational modes of an eggshell are modified by the physical properties of the egg white and yoke.

Accordingly, it is an object of the present invention to provide an apparatus and method for noninvasive, nondestructive, and rapid characterization of eggs.

Another object of the invention is to provide an apparatus and method for remote, noninvasive, nondestructive, and rapid characterization of eggs.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objects, and in accordance with the purposes of the present invention, as embodied and broadly described herein, the apparatus for noninvasive characterization of eggs of this invention include in combination means for applying low-frequency vibrational motion to an egg under investigation over a chosen range of frequencies, and means for detecting the amplitude of vibrational response of the vibrating egg as a function of applied frequency. Preferably, means are provided for locating and recording resonant vibrational responses in order to obtain a "signature" thereof which characterizes the egg. It is also preferred that the application of vibrational motion and the detection of the response thereto be achieved remotely to the egg.

In another embodiment of the present invention, in accordance with its objects and purposes, the method for noninvasively characterizing eggs hereof includes the steps of applying low-frequency vibrational motion to the egg under investigation over a chosen range of frequencies, and detecting the amplitude of vibrational response of the vibrating egg as a function of applied frequency. Preferably, the present invention includes a step of locating and recording resonant vibrational responses in order to obtain a "signature" thereof which characterizes the egg.

Benefits and advantages of the present invention include the ability to noninvasively, rapidly and remotely characterize eggs for properties such as shell thickness and integrity, condition of the yolk, freshness, and invasion by bacteria and other organisms.

BRIEF DESCRIPTION OF THE DRAWINGS

The accompanying drawings of which are incorporated in and form a part of the specification, illustrate the embodiments of the present invention and, together with the description, serve to explain the principles of the invention. In the drawings:

FIG. 1 is a schematic representation illustrating three embodiments of the apparatus of the present invention.

DETAILED DESCRIPTION OF THE PREFERRED EMBODIMENT OF THE INVENTION

Briefly, the present invention includes an apparatus and method for investigating the relationship between resonant acoustical vibrational spectra of eggs and puncturing of the yolk, cracks in the shell, and the effect of incubating Salmonella bacteria inside the egg, among other egg characteristics.

Figure 1A:
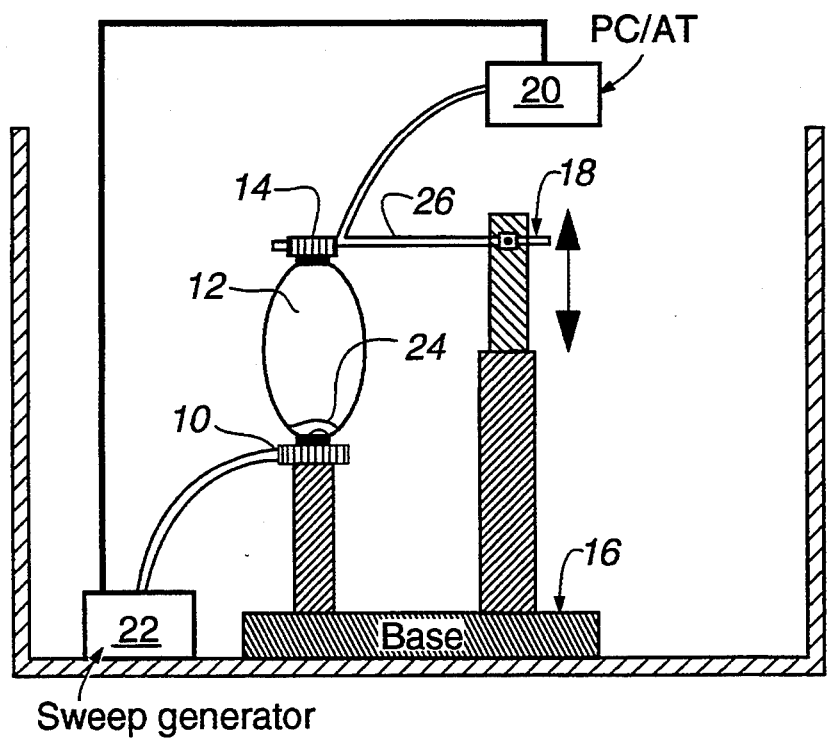
FIG. 1a shows the generation of vibrational motion in a vertically disposed egg and the detection of the response thereto using piezoelectric transducers in direct contact with the egg.

Reference will now be made in detail to the present preferred embodiments of the invention, examples of which are illustrated in the accompanying drawings. All similar or identical structure will be identified using the same callout numbers. Turning now to FIG. 1, three embodiments of the apparatus of the present invention are schematically illustrated. FIG. 1a shows the generation of vibrational motion in a vertically disposed egg and the detection of the response thereto using piezoelectric transducers in direct contact with the egg. Excitation piezoelectric transducer (PZT), 10, provides mechanical vibrational excitation to vertically disposed egg, 12, while the amplitude of vibration generated in the egg is detected by PZT 14. Support base, 16, and mechanical height adjustment means, 18, for PZT 14 were found not to resonate during the measurements; that is, no spurious vibrations were detected by the transducers. Measurements were performed in a polyethylene box.

Transducers having a wide-band, a 1 MHz center frequency, and diameters of 1 in. and 0.75 in. were employed, excitation transducer 10 having the larger diameter. However, these diameters are not important parameters. KYNAR PIEZO FILM (Pennwalt, Valley Forge, PA) was also utilized as detecting transducer 14.

A swept-frequency spectrum analyzer, controlled by an IBM PC/AT, 20, analyzed the detected signal from PZT 14, and further controlled frequency sweep generator, 22, which generally was used to drive PZT 10 in the range between 400 Hz and 2000 Hz with a sweep duration of 5 to 10 seconds for most measurements. The sine-wave excitation amplitude ranged between 5 and 8 V. Eggs, 12, were oriented with egg sac, 24, toward the bottom in order to maintain consistent egg orientation.

Before each measurement, the egg was gently shaken for a few seconds to dislodge the yolk from the shell membrane in case the yolk was partially attached. This permitted good reproducibility of the data if the measurements were repeated on any given egg. After being shaken, the egg was centered between the two transducers. No coupling fluid was used. Detecting transducer, 14, was disposed such that it lightly touched the egg. Its weight was largely supported by an arm, 26., attached height adjustment means 18. This sliding arm permits a very smooth movement of transducer 14 in the vertical direction. Two sets of measurements per egg were made: one with the egg's long axis in the vertical position (as shown in FIG. 1a), and the other with the long axis in the horizontal position.

The eggs used in this study were white, large Grade AA chicken eggs obtained from local food stores just prior to their use. For some eggs, a small hole, typically 1.5 mm in diameter, was made in the eggshell using a sterile drommel bit. This hole was placed along one spot on the minor axis of the egg, where the eggshell is flattest, without causing any further damage such as cracking or puncturing of the eggshell or egg yolk. The hole was then sealed with a small amount of DUCO cement (Devcon Corporation, Danvers, MA). The cement was found to have no effect on the acoustic resonances.

For some eggs, a single puncture was made in the egg yolk using a 22-gauge syringe needle (0.7 mm diameter). The needle was inserted into the 1.5 mm hole in the eggshell, and the tip of the needle inserted into the yolk once. These punctured eggs were sterile since Salmonella or any other bacteria were unable to be cultured from them. The eggs were opened after the acoustic measurements to examine their contents. No evidence that any yellow yolk material had escaped into the egg white through the 0.7 mm hole in the yolk was found.

For other eggs, viable Salmonella enteritidis bacteria were placed inside the egg and allowed to incubate at room temperature. The bacteria (ATCC13076) were obtained from the American Type Culture Collection. The introduction of the bacteria into the egg was accomplished by first dipping a small syringe needle into a culture of the bacteria and then wiping the needle on the edge of a sterile flask to remove the majority of the liquid. It is estimated that approximately 10,000 *Salmonella enteritidis* bacteria remained on the syringe needle in less than 0.005 $cm^3$ of liquid. The needle was then inserted just inside the eggshell into the egg white through the 1.5 mm hole in the shell. Care was taken not to puncture or touch the egg yolk with the needle. This careful insertion procedure allowed some or all of the bacteria to be introduced into the egg white. A small dab of DUCO cement was used to seal the 1.5 mm eggshell hole prior to measurements.

The bacteria were allowed to incubate in the egg at room temperature for 24 to 36 hours before acoustic measurements were made. Soon after the acoustic measurements, the egg white and yolk were aseptically cultured on Hektoen enteric agar to obtain an estimate of the live Salmonella bacteria concentration. In the yolk, the concentrations were always in excess of 1 million bacterial cells per gram. Concentrations in the egg white were less than 1000 per gram.

Figure 1B:
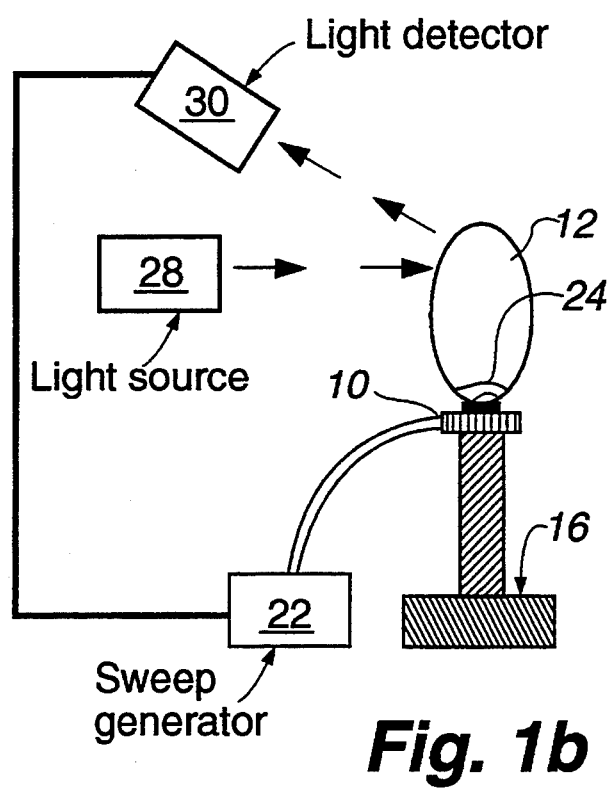
FIG. 1b shows the vibrational response induced by mechanically imparting vibrational motion to a vertically disposed egg using a piezoelectric transducer in direct contact therewith being observed remotely using a laser light source and a light detector.
Figure 1C:
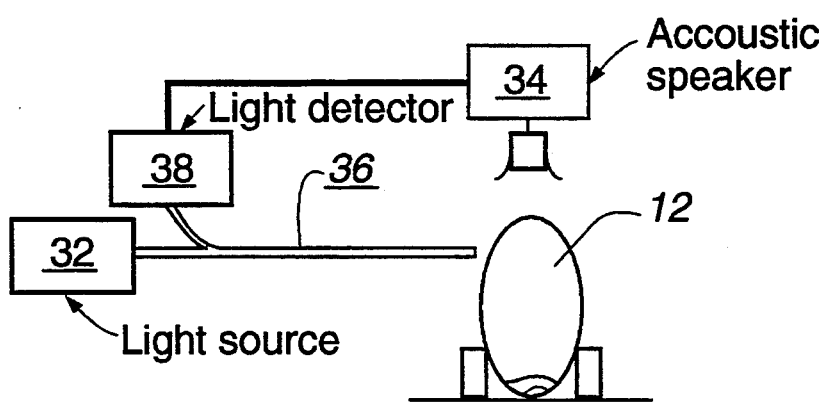
FIG. 1c shows the noncontact observation of the vibrational response using light delivered to the surface of a vertically disposed egg in which vibrational motion is generated using an acoustic speaker, and the reflected light being collected therefrom, both by optical fiber optics, and directed to a light detector.

FIG. 1b shows the vibrational response induced by mechanically imparting vibrational motion to a vertically disposed egg 12 using piezoelectric transducer 10 in direct contact therewith, as illustrated in FIG. 1a hereof, being observed remotely using a laser light source, 28, and a light detector, 30. A 5-mW He-Ne laser was employed as the light source, and the reflected light was directed onto a split photodiode in order to improve the signal-to-noise ratio of the measurements. FIG. 1c shows the noncontact observation of the vibrational response using light delivered to the surface of a vertically disposed egg 12, from a light-emitting diode or other light source 32, in which vibrational motion is generated using an acoustic speaker, 34, and the reflected light being collected therefrom, both by optical fiber means, 36, and directed to light detector 38. Clearly, various combinations of excitation and detection techniques are possible; for example, acoustical speaker 34 in FIG. 1c could be used to provide vibrational excitation in FIG. 1b.

Figure 2:
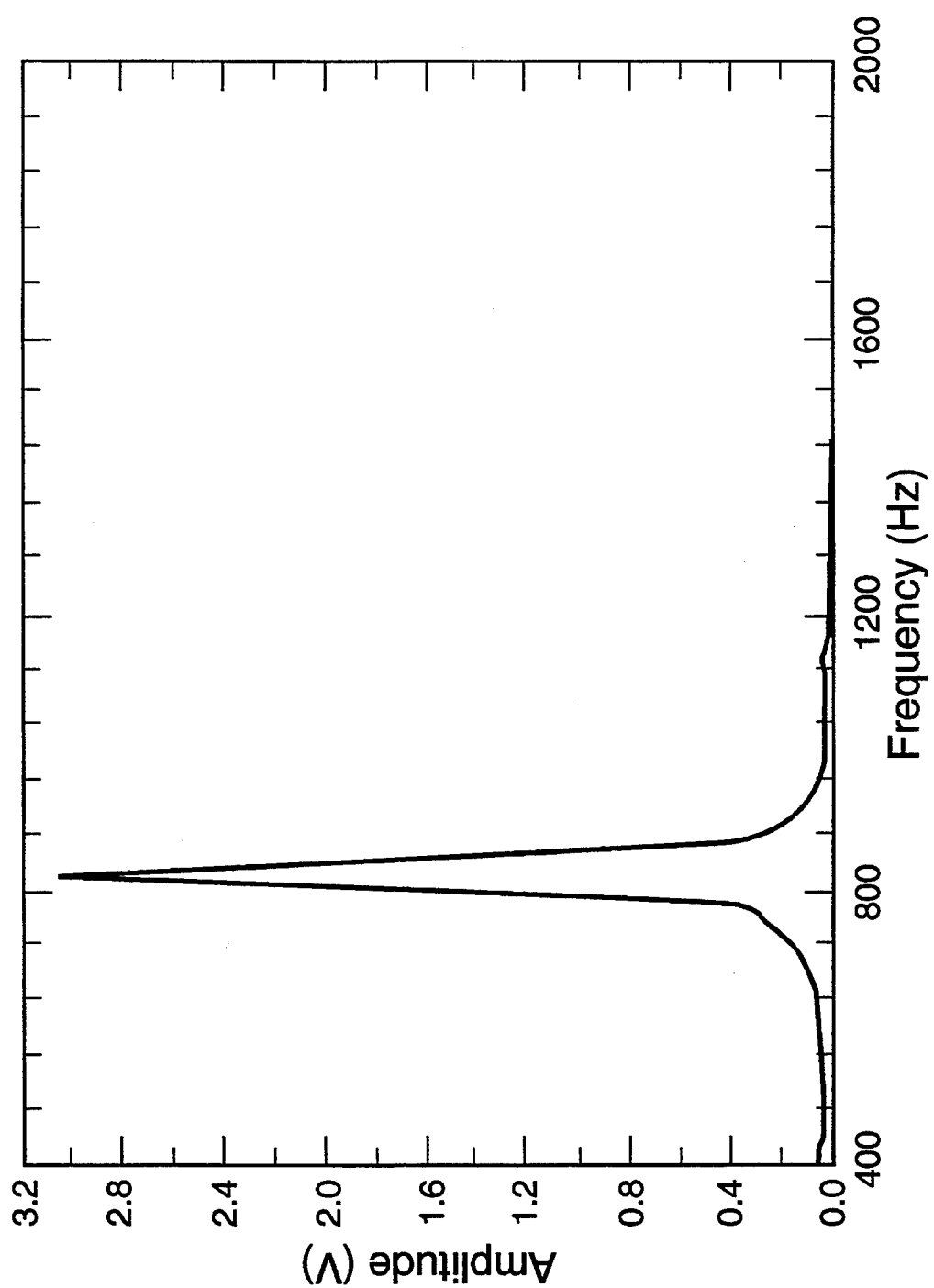
FIG. 2 displays a typical resonance spectrum for a normal egg which is oriented vertically.

Egg resonances are referred to as vertical or horizontal depending on the physical orientation of the egg. However, the physical orientation of the egg was not found to be important. Rather, the direction of the vibrational excitation is relevant. Therefore, vertically disposed eggs are excited along their long axes, while horizontally disposed eggs are excited along their short axes. FIG. 2 shows a typical resonance curve for a normal egg with no holes or Salmonella bacteria, and with the egg oriented vertically. There is a single resonance peak around 830 Hz. No other significant vertical resonances were found between 20 Hz and 100 kHz. No resonances were observed if the eggshell had a crack greater than 1 cm in length.

The horizontal resonance spectra were not found to be significantly affected by the treatment given the eggs. Generally, only one resonance peak having a center frequency near 680 Hz with an amplitude typically 3 to 4 times greater in magnitude than the vertical peak was observed. It is believed by the inventors that this difference in the resonances between the two orthogonal orientations can be explained by the fact that the egg is mechanically stronger (analagous to a higher spring constant) in the vertical (major-axis) direction than in the horizontal (minor-axis) direction. It should be mentioned that any effect of mass-loading on the resonant frequencies by the direct-contact transducers is insignificant, as was verified by the noncontact measurements.

An average frequency, $<f>$, may be defined for the vertical measurements as $$<f> = \frac{\int V(f) f df}{\int V(f) df}$$

where f is the frequency in Hz, V(f) is the voltage signal from the detecting PZT as a function of f, and the integrals are over the frequency range from 400 Hz to 2000 Hz. The $<f>$ values for vertical orientations for various egg treatments are shown in the Table.

Figure 3:
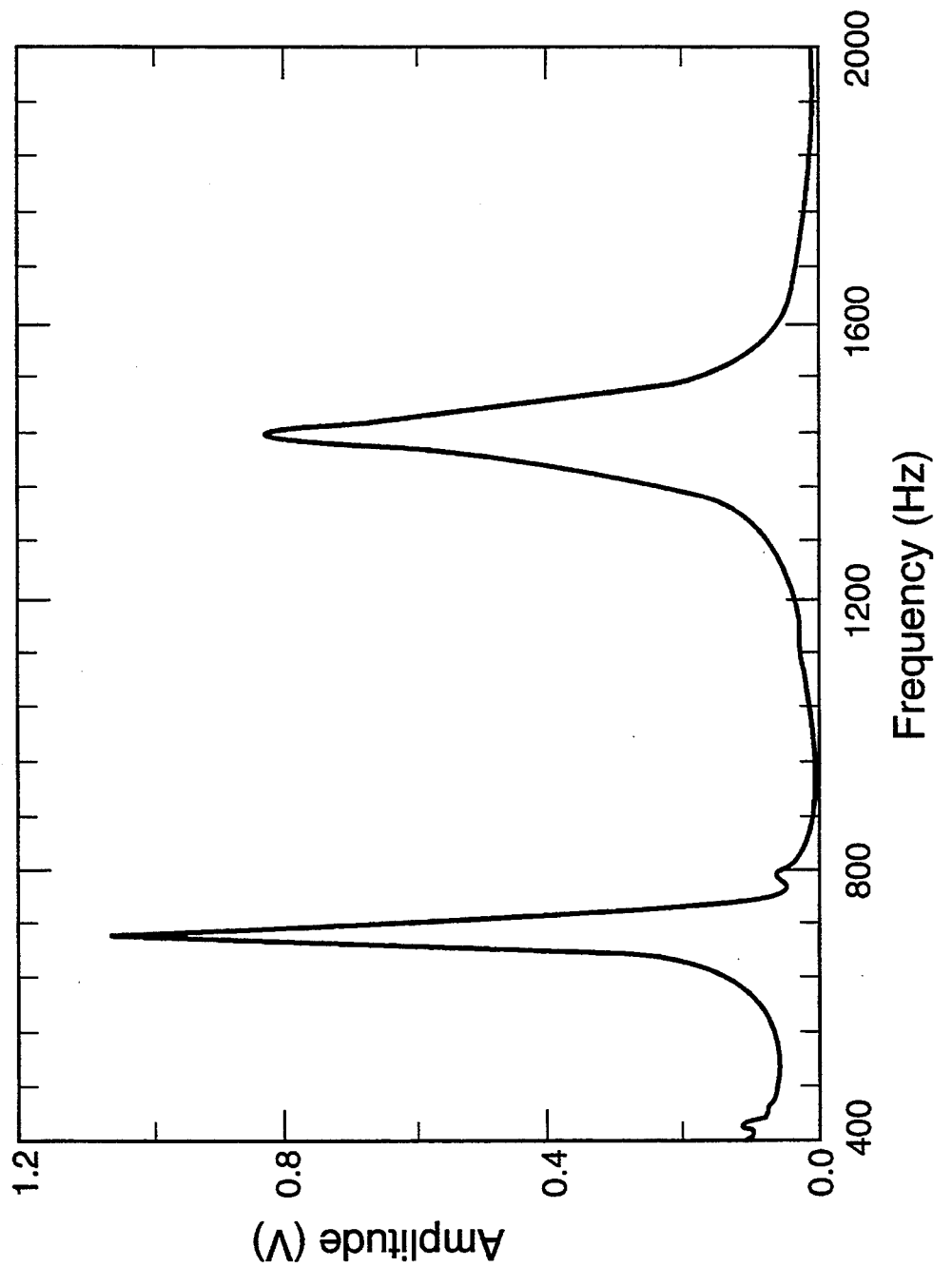
FIG. 3 displays a typical resonance spectrum for a Salmonella-infected egg, showing the presence of an additional resonance at higher frequency.

The observed vertical resonance spectra are characterized as one of three types. A typical Type-1 spectrum is shown in FIG. 2: there is only one resonance peak below 1250 Hz. Type-2 spectra have two or more vertical resonances, all below 1250 Hz. An example of a Type-3 spectrum is shown in FIG. 3. Type-3 spectra have at least one resonance peak above 1250 Hz. The choice of 1250 Hz is arbitrary.

As shown in the Table, normal eggs with no special treatment do not show Type-3 vertical resonance spectra. Eggs with a 1.5 mm hole in the shell showed spectra similar to eggs receiving no treatment, except for an increase in the percentage of eggs showing Type-2 spectra.

Two-thirds of the eggs with a 0.7 mm hole in the yolk exhibited Type-3 spectra, while one-fourth of the Salmonella-infected eggs (with no puncture hole in the

TABLE

Summary of acoustic resonance measurements on eggs receiving differing treatments

| Treatment | Number of eggs measured | Type 1 spectrum | Type 2 spectrum | Type 3 spectrum | Mean $<f>$ vertical (Hz) |
|---|---|---|---|---|---|
| none | 36 | 53% | 47% | 0% | 830 ± 80 |
| hole in shell | 18 | 22% | 78% | 0% | 834 ± 107 |
| Salmonella | 17 | 35% | 41% | 24% | 876 ± 235 |
| hole in shell & yolk | 12 | 17% | 17% | 67% | 986 ± 202 | yolk) showed Type-3 spectra. In yolk-punctured or Salmonella-infected eggs, values of $<f>_{vertical}$ are greater than in untreated eggs. As stated, Salmonella bacteria were not injected directly into the yolk. In all cases, however, the bacteria appear to have entered the yolk and multiplied. Care was exercised when inserting the Salmonella into the egg white that the yolk was not punctured. There was no evidence of yolk puncture. The inventors believe that the effect of Salmonella on the resonance behavior can, perhaps, be explained by the fact that the presence of bacteria in the yolk, in excess of 1 million per gram (following incubation), affects the physical properties, that is, the speed of sound, viscosity, density, and bulk modulus, of the egg yolk. An alternative explanation might be related to the manner in which the bacteria enter the yolk. Other researchers have observed that bacteria, once in the egg white, can frequently and rapidly enter the yolk and multiply. That is, the Salmonella bacteria must puncture the yolk membrane in order to gain access to the yolk material. If sufficient numbers of bacteria puncture the yolk, the effect is similar to puncture using a needle. Bacteria not reaching the yolk quickly enough are killed by antibacterial materials in the egg white.

The results of the acoustic resonance measurements are not significantly affected by normalizing the resonance frequencies or amplitudes to any of the following quantities (or their reciprocals): the largest vertical (or horizontal) resonance frequency or amplitude, the egg weight, the length of the egg along the major axis (L), the width of the egg along the minor axis (W), $\sqrt{L/W}$, L/W, or $(L/W)^2$.

The other means for exciting vibrations in the egg identified hereinabove, such as excitation using moving coil speakers, both in contact with the egg and adjacent to the egg (but not in actual contact therewith), were found to give similar results to the direct contact excitation and detection. The data set forth in the TABLE, however, are all from an apparatus of the type illustrated in FIG. 1a, where the PZT transducers are in full contact with the egg.

The foregoing description of the preferred embodiments of the invention have been presented for purposes of illustration and description. It is not intended to be exhaustive or to limit the invention to the precise form disclosed, and obviously many modifications and variations are possible in light of the above teaching. For example, it would be apparent to one having skill in the art after studying the present disclosure, that several eggs might be remotely excited simultaneously by an energy source such as an acoustic speaker, and the resonance spectra thereof be simultaneously observed by a series of optical fiber bundles, one per egg, providing input to a mechanical egg separator, thereby automating the characterization and egg selection processes. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method for establishing the presence of Salmonella bacteria in eggs, comprising the steps of:
   a. applying periodic low-frequency vibrational motion to an egg under investigation by sweeping over a chosen range of frequencies having similar amplitudes;
   b. detecting amplitudes of a resonant vibrational response of the egg resulting from the vibrational motion applied thereto as a function of the applied frequencies;

c. locating and recording the resonant vibrational response of the egg under investigation; and d. comparing the resonant vibrational response with that for an egg containing no Salmonella bacteria, whereby the presence of a resonance in the resonant vibrational response of the egg under investigation at substantially higher frequencies and comparison to the resonant vibrational response for an egg containing no Salmonella bacteria indicates the presence of Salmonella bacteria in the egg under investigation.

2. The method as described in claim 1, wherein said step of applying low-frequency vibrational motion is accomplished using a piezoelectric transducer in contact with the egg under investigation.

3. The method as described in claim 1, wherein said step of detecting amplitudes of vibrational response is accomplished using a piezoelectric transducer in contact with the egg under investigation.

4. The method as described in claim 1, wherein said step of detecting amplitudes of vibrational response is accomplished using a laser, the output of which is directed onto the surface of the egg under investigation, and light detection means for detecting incident light which is reflected by the egg under investigation.

5. The method as described in claim 4, wherein said step of applying low-frequency vibrational motion is achieved using at least one acoustical speaker.

6. The method as described in claim 1, wherein said step of detecting amplitudes of vibrational response is accomplished using a light source and fiber optic means for directing light from the light source onto the surface of the egg under investigation, a light detector, and fiber optic means for receiving incident light which is reflected by the egg under investigation and directing the reflected light onto the light detector.

7. The method as described in claim 1, wherein said step of applying low-frequency vibrational motion is accomplished using at least one acoustical speaker.

* * * * *